United States Patent
Rivera et al.

(10) Patent No.: US 10,746,268 B2
(45) Date of Patent: Aug. 18, 2020

(54) GEAR NUT ADJUSTMENT ASSEMBLY

(71) Applicant: Hawk Industries, Inc., Signal Hill, CA (US)

(72) Inventors: Michael Ernest Rivera, Garden Grove, CA (US); Michael A. Russo, Signal Hill, CA (US)

(73) Assignee: Hawk Industries, Inc., Signal Hill, CA (US)

( * ) Notice: Subject to any disclaimer, the term of this patent is extended or adjusted under 35 U.S.C. 154(b) by 1641 days.

(21) Appl. No.: 13/849,123

(22) Filed: Mar. 22, 2013

(65) Prior Publication Data

US 2013/0283946 A1    Oct. 31, 2013

Related U.S. Application Data

(60) Provisional application No. 61/793,768, filed on Mar. 15, 2013, provisional application No. 61/614,368, filed on Mar. 22, 2012.

(51) Int. Cl.
*F16H 25/16* (2006.01)
*E21B 19/16* (2006.01)
*F16H 25/20* (2006.01)

(52) U.S. Cl.
CPC .............. *F16H 25/16* (2013.01); *E21B 19/16* (2013.01); *F16H 25/20* (2013.01); *F16H 2025/2081* (2013.01); *Y10T 74/18576* (2015.01)

(58) Field of Classification Search
CPC .. F16H 25/16; F16H 25/20; F16H 2025/2081; E21B 19/16; E21B 19/168; E21B 19/164; E21B 19/163; E21B 19/165; Y10T 74/18576; B25B 5/147
USPC ............................ 81/57.19, 54, 56, 57, 57.11
See application file for complete search history.

(56) References Cited

U.S. PATENT DOCUMENTS

| | | | | |
|---|---|---|---|---|
| 2,615,682 A | | 3/1951 | Stone | |
| 5,060,542 A | * | 10/1991 | Hauk | E21B 19/163 81/57.16 |
| 5,386,746 A | * | 2/1995 | Hauk | E21B 19/163 81/57.16 |
| 6,374,706 B1 | * | 4/2002 | Newman | E21B 19/166 81/57.16 |

(Continued)

*Primary Examiner* — David B. Thomas
(74) *Attorney, Agent, or Firm* — Avyno Law P.C.

(57) ABSTRACT

A gear nut adjustment assembly is provided that receives and powers an adjustable jaw assembly for purposes of making or breaking a tubular connection. The adjustable jaw assembly is capable of receiving pipes of various diameters through an automated means. In one example of an implementation of the invention, the gear nut adjustment assembly of the present invention includes a housing for mounting a nut assembly at one end and a motor at the other end. The housing includes a front and rear housing where the front housing has a mounting assembly for mounting a nut assembly. The nut assembly includes at its rear end a ring gear. The rear housing further includes a drive gear positioned in between the front and rear housing in engagement with the ring gear of the nut assembly. The drive gear is driven by the motor attached to the back of the rear housing and, through engagement with the ring gear on the nut assembly, rotates the nut assembly to adjust the jaws of the adjustable jaw assembly.

18 Claims, 14 Drawing Sheets

(56) References Cited

U.S. PATENT DOCUMENTS

| | | | |
|---|---|---|---|
| 7,000,503 B2 * | 2/2006 | Dagenais | E21B 19/166 81/432 |
| 7,028,585 B2 * | 4/2006 | Pietras | E21B 19/164 81/57.11 |
| 7,530,294 B2 | 5/2009 | Myburgh | |
| 7,707,914 B2 | 5/2010 | Pietras et al. | |
| 7,942,081 B2 | 5/2011 | Hauk et al. | |
| 2005/0076744 A1 * | 4/2005 | Pietras | E21B 19/163 81/57.16 |
| 2005/0121907 A1 * | 6/2005 | Le Devehat | F16L 37/1205 285/320 |

\* cited by examiner

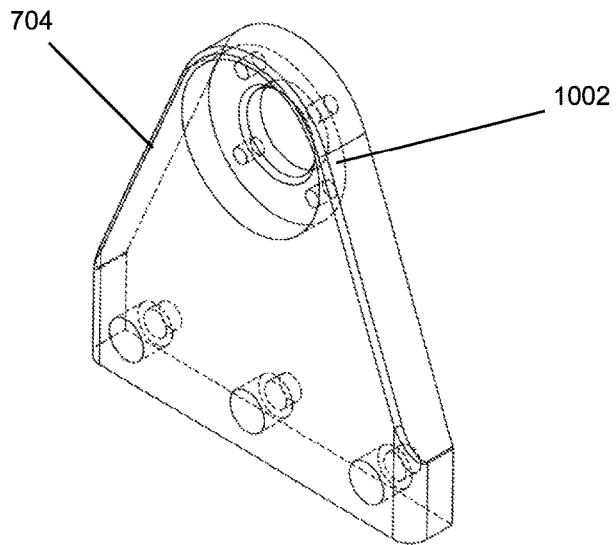
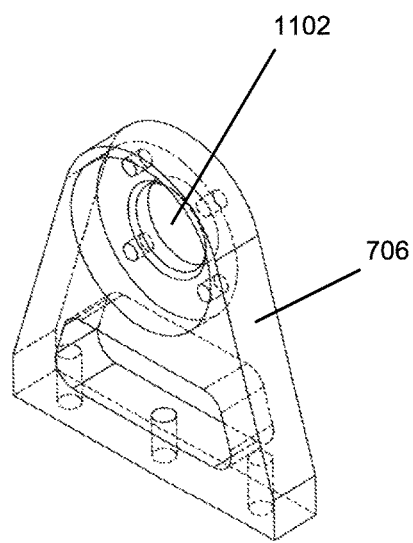
FIG. 10  FIG. 11
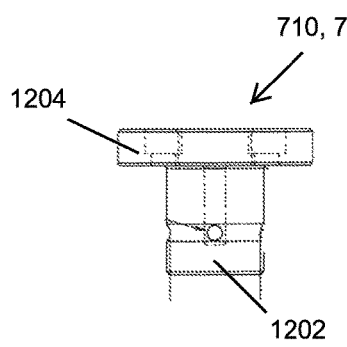
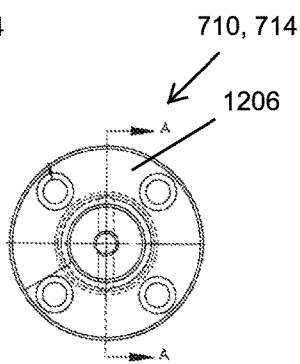
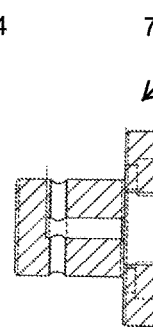
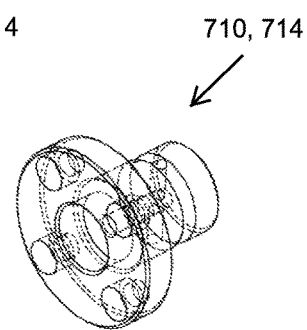
FIG. 12a  FIG. 12b  FIG. 12c  FIG. 12d

GEAR NUT ADJUSTMENT ASSEMBLY

RELATED APPLICATIONS

This application claims priority of U.S. Provisional Patent Application Ser. No. 61/793,768, filed Mar. 15, 2013 titled GEAR NUT ASSEMBLY and U.S. Provisional Patent Application Ser. No. 61/614,368, filed on Mar. 22, 2012, titled AUTOMATICALLY ADJUSTABLE POWER JAW WITH REMOTELY ADJUSTED NUT, both applications of which are incorporated in their entirety by reference in this application.

BACKGROUND OF THE INVENTION

1. Field of the Invention

The present invention generally relates to equipment used in the maintenance and servicing of oil and gas production wells, and more particularly, relates to power jaws or wrenches of the type used in conjunction with making or breaking threaded joints between successive tubing elements that make-up the continuous tubing string extending through a well bore into the underground deposits.

2. Related Art

In the construction of oil or gas wells, it is usually necessary to construct long drill pipes. Due to the length of these pipes, sections of pipe are progressively added to the pipe string as it is lowered into the well from a drilling platform. It is common practice to use wrench assemblies to apply a predetermined torque to make-up or break out the drill pipe connections. The wrench assemblies are typically located on a platform, either on rails or hung from a derrick on a chain. Examples of prior art wrench assemblies are described in U.S. Pat. Nos. 5,060,542; 5,386,746 and 5,868,045 all issued to inventor Thomas D. Hauk. The text of all three patents U.S. Pat. Nos. 5,060,542, 5,386,746 and 5,868,045 are incorporated by reference in their entirety into this application.

To make-up or break out a threaded pipe connection, the wrench assemblies of the prior art general include the use of an active (or wrenching) jaw device that supplies torque to the section of pipe above or below the threaded connection, while a passive (or back up) jaw device supplies a reaction torque below or above the threaded connection, respectively, depending upon whether the pipe connection is being made-up or broken out. Particularly, the prior art wrench assemblies described in U.S. Pat. Nos. 5,060,542; 5,386,746 and 5,868,045 disclose the use of three levels of jaws, where the jaws at each level are of a type that energize when turned in a predetermined direction so as to have a stronger grip on the pipe when turned in such direction. The jaws on the top and bottom levels are oriented so as to turn the pipe in one direction, while the jaw on the middle level is oriented to turn the pipe in the opposite direction. The upper, middle and lower jaws are positioned in vertically spaced relationship and connected together in a self-contained tool or wrench assembly. The upper and lower jaws are fixed to a common frame, whereas the middle jaw is pivotally connected between the upper and lower jaws on the common frame.

To form a pipe joint, the top pipe section is rotated (spun up), as by a spinning tool, until only final tightening is required. Then, the wrench assembly is adjusted such that the upper jaw engages a section of the pipe just above the pipe joint. The middle jaw then engages the section of the pipe just below the pipe joint. The lower jaw is positioned below the tool joint, being then adjacent to the pipe itself, but does not engage the pipe when the joint is being made-up. The upper and middle jaws are then closed on the pipe, following which the upper jaw set is rotated to make the joint. Thereafter, the upper and middle jaw sets are opened so as to release the tightened pipe joint.

To break (or loosen) a joint prior to unthreading, as by spinning out by use of a conventional spinning tool, the wrench assembly is moved vertically such that the middle jaw engages the pipe assembly just above the joint and the lower jaw engages the pipe assembly just below the lower joint. When loosening a joint, the upper jaw is usually positioned above the joint but is not in engagement with the pipe assembly. The middle and lower jaws are then closed on the pipe assembly above and below the joint respectively. The middle jaw is then rotated counterclockwise to break or loosen the joint.

In summary, making of a pipe joint is accomplished by locking the middle jaws on the bottom portion of a pipe joint, and employing the top and middle jaws to turn the top portion of the pipe joint clockwise. Breaking of a joint is accomplished by locking the bottom jaws on the bottom pipe joint portion, and employing the middle and bottom levels of jaws to rotate the top portion of the pipe joint counterclockwise.

The jaws of the current wrench assemblies are capable of adapting to receive pipes of various diameters. FIGS. 1 and 2 illustrate an example of an adjustable power jaw 100 used in the wrench assemblies. As illustrated, each jaw 100 includes a hook 102 having a threaded shank end 202 extending from the hook, a head 104 adapted to receive the shank end 202 of the hook 102, and an adjustment assembly 106 at the end of the head 104 opposite the hook 102 for threadedly engaging the shank end 202 of the hook 102. Typically, the hook 102 and the adjustment assembly 106 are pivotally mounted to the head 104. In some instances, the adjustment assembly 106 may include a nut assembly having handles that facilitate the manually turning of the nut in either direction to open and close the hook end 102 of the jaw 100 to receive pipes of varying diameters. In other instances, the adjustment assembly 106 may be automated. The relationship between the nut, hook 102 and head 104 are such that the rotation of the nut causes the jaw 100 to open or close to a desired position relative to the particular diameter of the pipe joint.

To make-up or break out a drill pipe connection, high torque must be supplied over a large angle which is supplied through energizing the jaws. The jaws are initially energized by providing fluid-operated grip cylinders that pivot the hook and head relative to one another, closing and thereby tighten the grip the jaw has on the pipes. The initial engagement of the pipe by the grip cylinders commences the torquing, which allows subsequent torquing to be more effective. Other fluid-operated means, such as a hydraulic torque cylinder, are then provided to effect the torquing.

As explained above, while the prior art jaws include automated mechanisms for gripping the pipe and for applying high torque to the jaws, the prior art jaws still require manual adjustment of the wrenches to allow for the receipt of pipes of varying diameter. As such, to commence the making and breaking process, each jaw has to be manually opened and closed to allow the wrenches to receive pipes of varying diameter. Requiring manually operation of the jaws increases the operational time associated with the make-up and break out process and also increase the risk of injury by operator contact with the wrench assembly.

Recently, improvements to the wrench assemblies have been made that provide for the automatic adjustment of the jaw assemblies, such that the jaw assemblies can be automatically adjusted. One such automatically adjustable power jaw assembly is taught in U.S. Pat. No. 7,942,081, issued to Thomas D. Hauk et al., the text of which is incorporated by reference in its entirety into this application.

While automatically adjustable assemblies are known in the art, a need still exists for an automatic jaw assembly that further reduces the time it takes to make-up or break out a tubular connection, is more compact, efficient, and that continues to minimize operator contact.

SUMMARY

A gear nut adjustment assembly is provided that receives and powers an adjustable jaw assembly for purposes of making or breaking a tubular connection. The adjustable jaw assembly is capable of receiving pipes of various diameters through an automated means. In one example of an implementation of the invention, the gear nut adjustment assembly of the present invention includes a housing for mounting a nut assembly at one end and a motor at the other end. The housing includes a front and rear housing where the front housing has a mounting assembly for mounting a nut assembly. The nut assembly includes at its rear end a ring gear. The rear housing further includes a drive gear positioned in between the front and rear housing in engagement with the ring gear of the nut assembly. The drive gear is driven by the motor attached to the back of the rear housing and, through engagement with the ring gear on the nut assembly, rotates the nut assembly to adjust the jaws of the adjustable jaw assembly. The motor may be a hydraulic motor or any other motor capable of driving the drive gear in both directions.

The nut adjustment assembly may be operated by a control unit to allow for the automatic opening and closing of the jaw for receiving pipes of varying diameters. When utilizing more than one jaw, such as in a wrench (or jaw) assembly, all the jaws in the assembly may be simultaneously or sequentially controlled to open and close the jaws on the pipe joints for making and breaking the joints. Simultaneous automated control of the opening and closing of the jaws provides for reduced make-up and break-up time, as well as increased safety features.

In another implementation of the invention, a gear nut adjustment assembly is provided for receiving the shank end of a hook of a power jaw assembly. The nut gear assembly includes a nut assembly having a ring gear mounted on the rear of the nut assembly, wherein the nut assembly has a threaded interior for passing the shank end of the hook of the power jaw through the nut assembly, and a motor operative coupled to the nut assembly, wherein the motor is offset from the shank end such that it does not interfere with the linear translation of the shank end.

In yet another implementation of the invention, a method of increasing the operating torque of a gear nut adjustment assembly is provided. The method includes the steps of providing a nut assembly having a ring gear mounted on the rear of the nut assembly, where the nut assembly is in threaded engagement with a shank end of the hook of a power jaw and, where the rotation of the ring gear translates the shank end linearly, providing drive gear operatively coupled to the ring gear, where the drive gear has fewer teeth than the ring gear and where the drive gear is coupled to a motor, applying an input torque to the drive gear, and transmitting the input torque to the ring gear to increase the torque to translate the end shank.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

FIG. 10 is a side perspective view of the upper pivot mount of the mounting assembly of FIG. 7.

FIG. 11 is a side perspective view of the lower pivot mount of the mounting assembly of FIG. 7.

FIGS. 12a-12d illustrated side top cross-section and perspective views, respectively, of the pivot pens utilizing the mounting assembly of FIG. 7.

DETAILED DESCRIPTION

Figure 1:
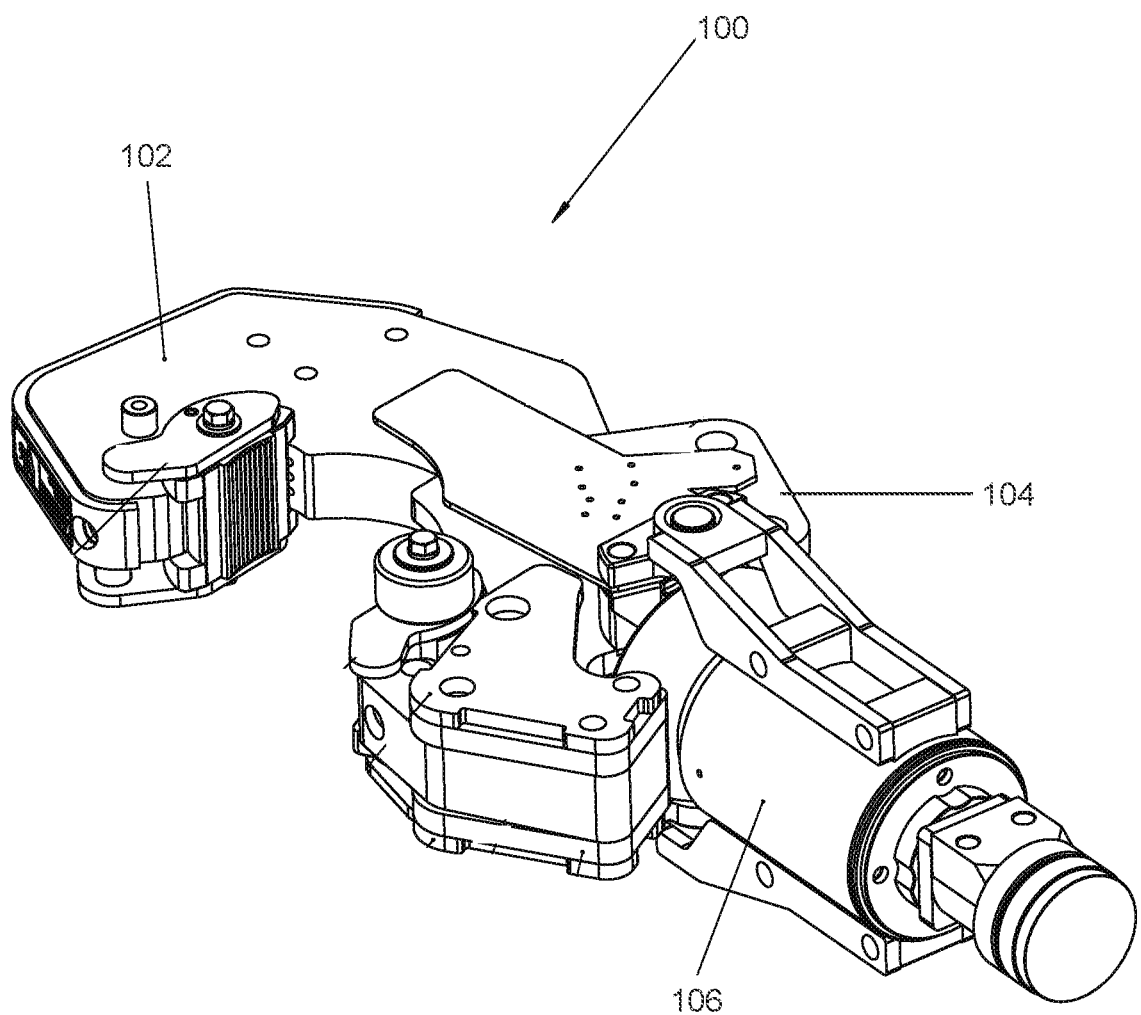
FIG. 1 illustrates a perspective view of a prior art automatically adjustable power jaw utilized in a wrench assembly.
Figure 2:
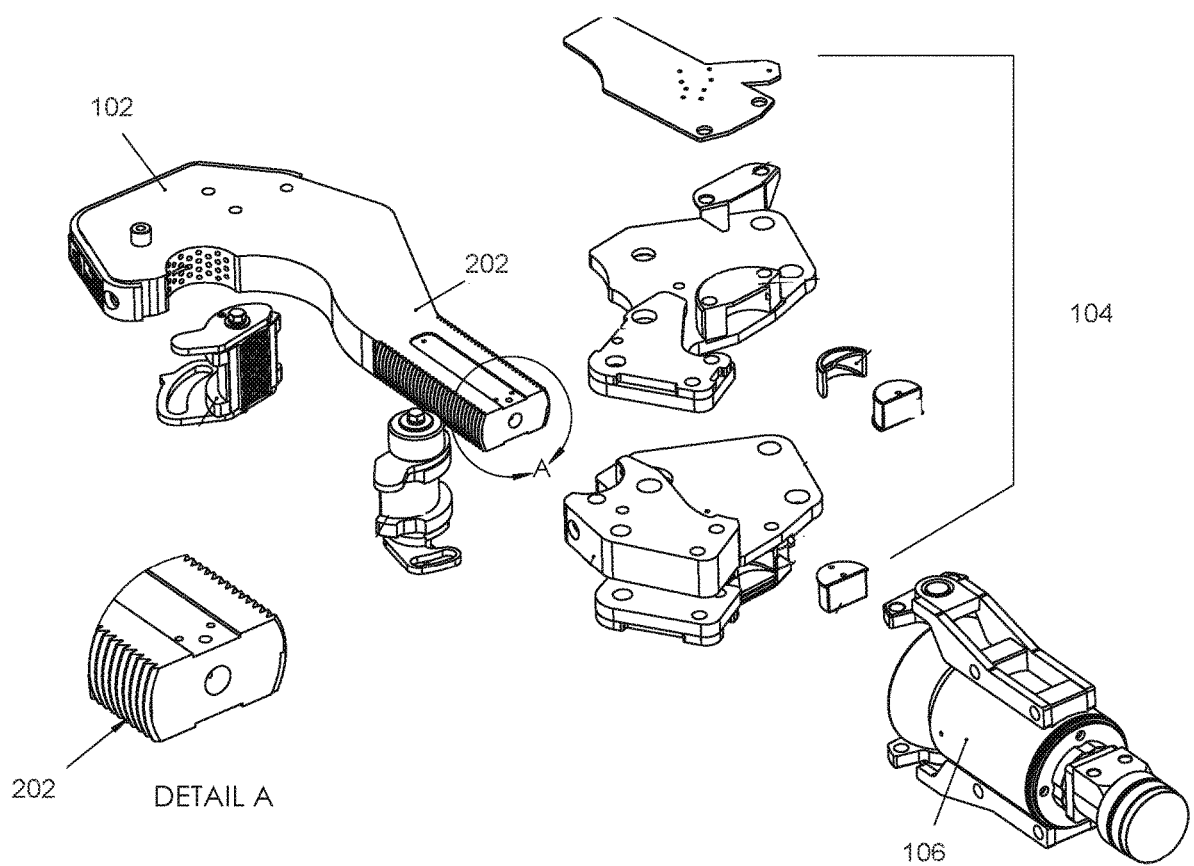
FIG. 2 is an exploded view of the adjustable power jaw of FIG. 1.

FIGS. 3 through 22 illustrate a gear nut adjustment assembly 300 that is provided for facilitating the automatic adjustment of a power jaw (see FIGS. 1 and 2). As known in the art, a power jaw includes a hook end 102 and a shank end 202, where the shank end 202 is threaded and received in the nut assembly 308 of the gear nut adjustment assembly 300. In most arrangements, the hook 102 and the adjustment assembly 106 are pivotally mounted to a head 104. The rotation of the nut assembly 308 moves the shank end 202 of the power jaw from an open to closed position or an closed to open position depending upon the direction of rotation of the nut assembly.

As used in this application, terms such as "communicate" and "in . . . communication with" (for example, a first component "communicates with" or "is in communication with" a second component) are used herein to indicate a structural, functional, mechanical, electrical, signal, optical, magnetic, electromagnetic, ionic or fluidic relationship between two or more components or elements. As such, the fact that one component is said to communicate with a second component is not intended to exclude the possibility that additional components may be present between, and/or operatively associated or engaged with, the first and second components.

Figure 3:
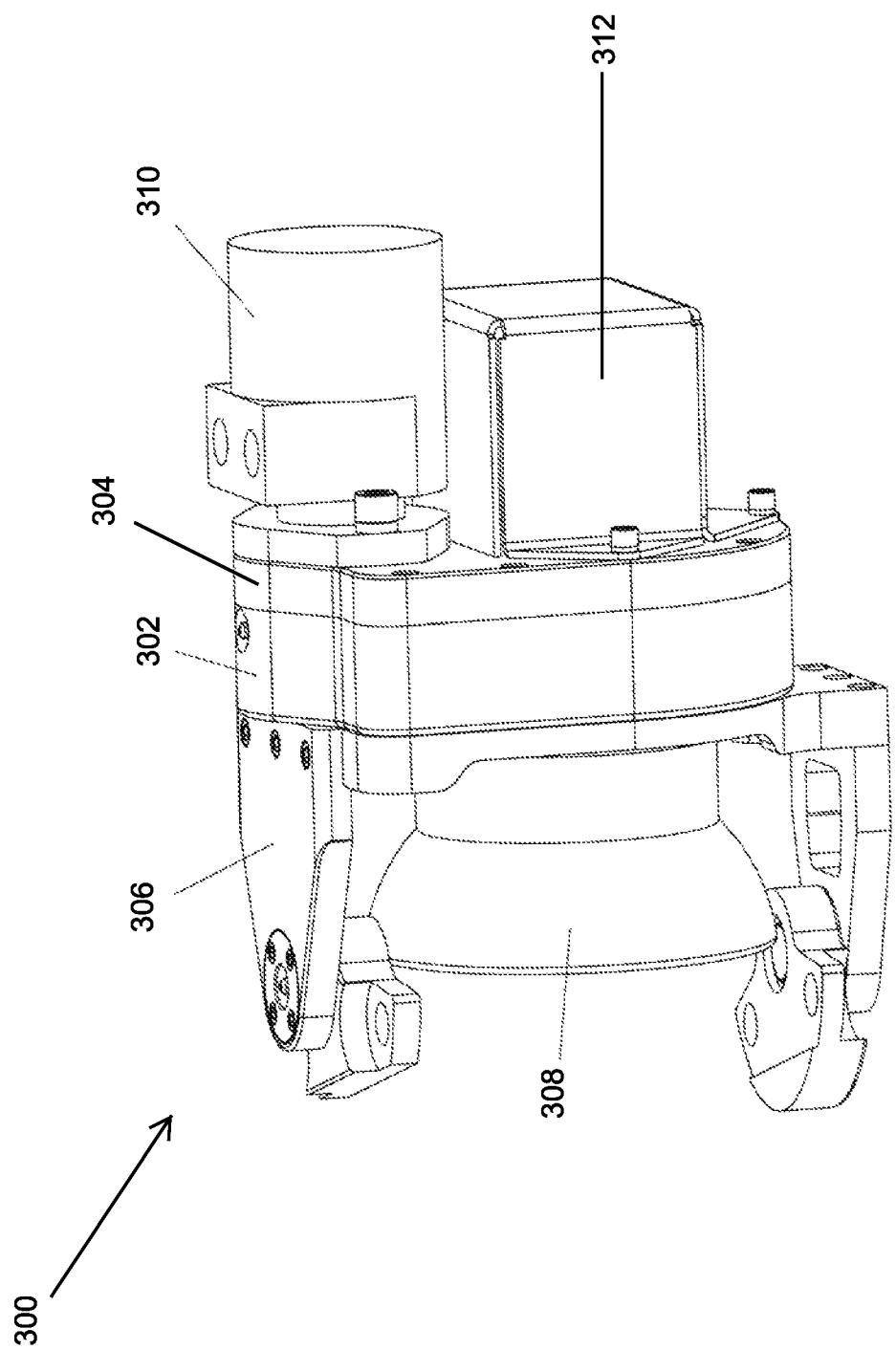
FIG. 3 is a side perspective view of one example the gear nut adjustment assembly of the present invention.

Turning now to FIG. 3, FIG. 3 is a side perspective view of one example a gear nut adjustment assembly 300 of the present invention. As illustrated, the gear adjustment assembly 300 includes a front housing 302, a rear housing 304, and a mount assembly 306 for retaining the head 104 of the of jaw assembly (See FIGS. 1 and 2). Contained within the housing is a nut assembly 308 and a motor 310 and hook cover 312 are affixed to the back surface of the rear housing 302. In most implementations, the various parts of the gear adjustment assembly 300 may be made of stainless steel, iron, chrome, or any other suitable non-corrosive material.

Figure 4:
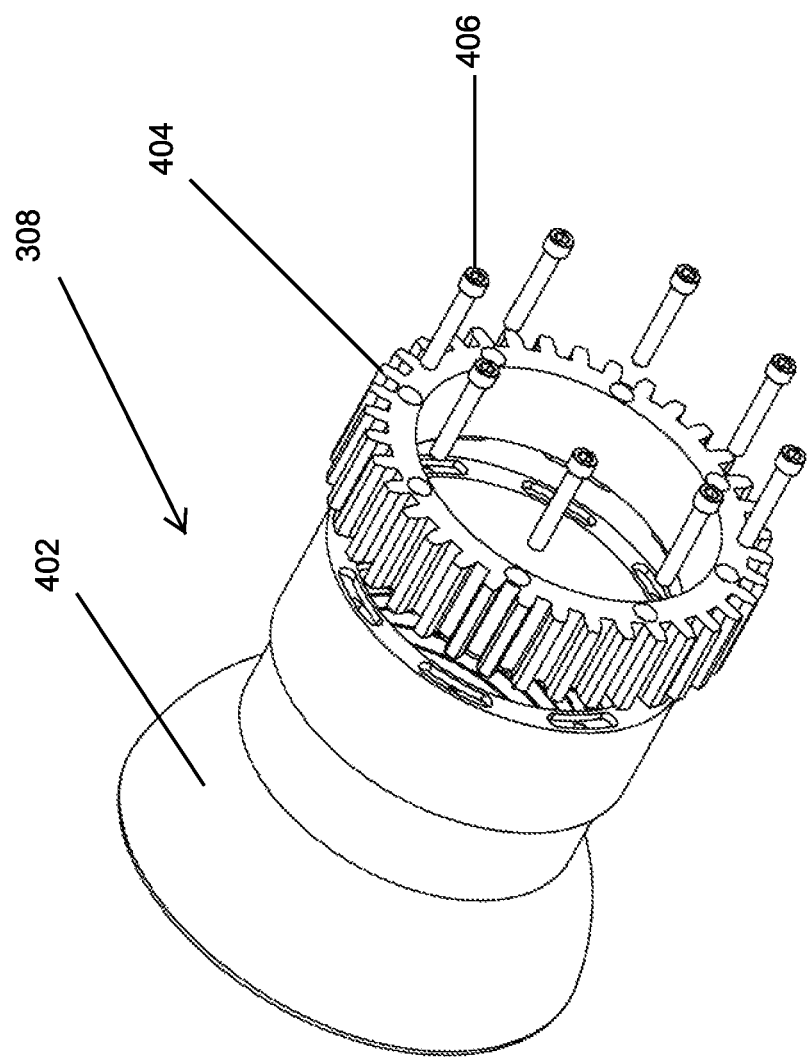
FIG. 4 is a rear perspective view of the one example of the nut adjustment assembly of the present invention.

FIG. 4 is a rear perspective view of one example of the nut assembly 308 of the present invention. The nut assembly 308 may include a rotatable adjustment nut 402 coupled to a ring gear 404 having a plurality of teeth. The adjustment nut 402 is adapted for threadedly engaging the shank end 202 (FIG. 2) of the hook 102 (FIG. 1). A shown, the ring gear 404 is coupled to the adjustment nut 402 by fasteners 406. In certain implementations, the fasteners 406 may include ¼-20 socket head screws.

Figure 5:
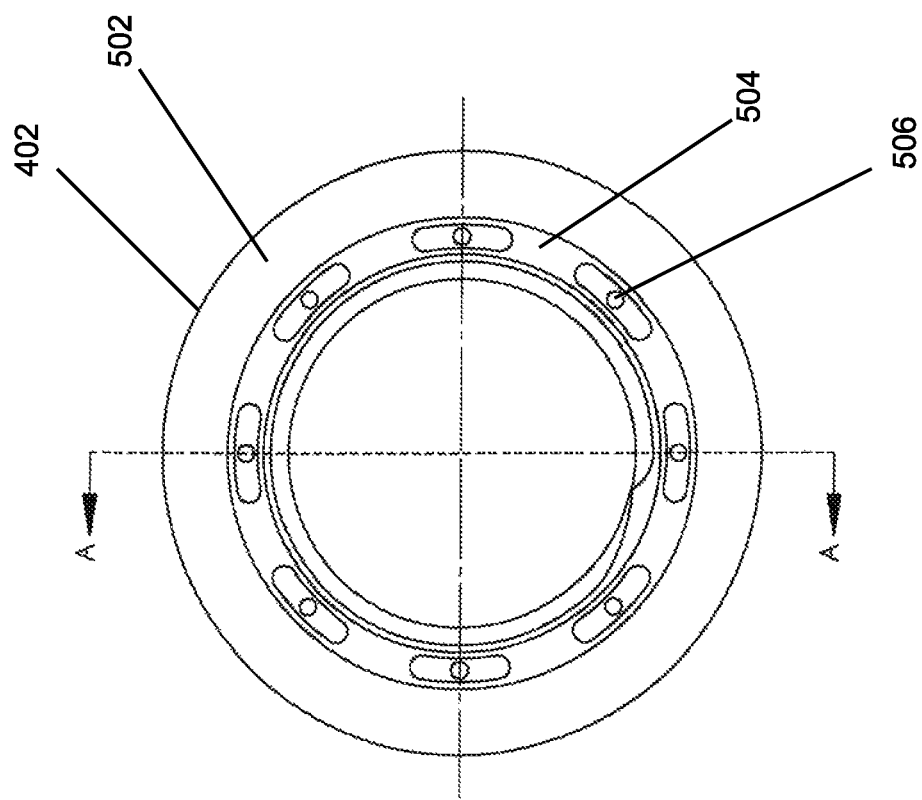
FIG. 5 is a rear view of the nut adjustment assembly of the present invention illustrated with the ring gear removed.

FIG. 5 is a rear view of the hex nut assembly 308 of the present invention illustrated with the ring gear removed. The rotatable nut 402 includes a nut housing 502 having a flange 504 comprising diametrically arranged threaded tap holes 506 for receiving fasteners 406.

Figure 6:
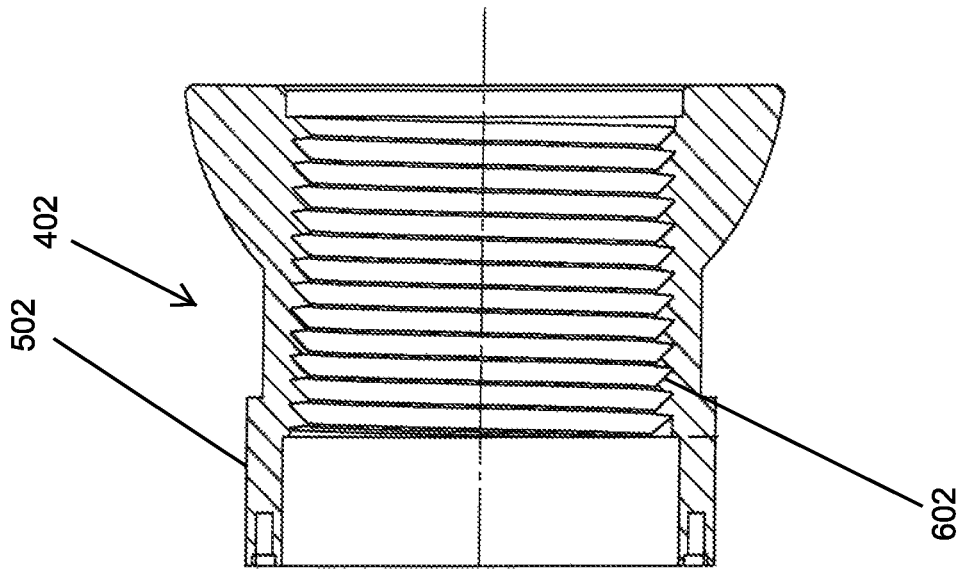
FIG. 6 is a cross-section view of the nut adjustment assembly of FIG. 5 taken along line 5-5.

FIG. 6 is a cross-section view of the nut adjustment assembly of FIG. 5 taken along line 5-5. As shown, nut 402 includes a threaded opening 602, extending through the center of the nut housing 502, for receiving the threaded shank end of the hook. The opening 602, about its circumference, is threaded for threadedly engaging the threading on the shank end 202 of the hook 102 (FIGS. 1 & 2).

Figure 7:
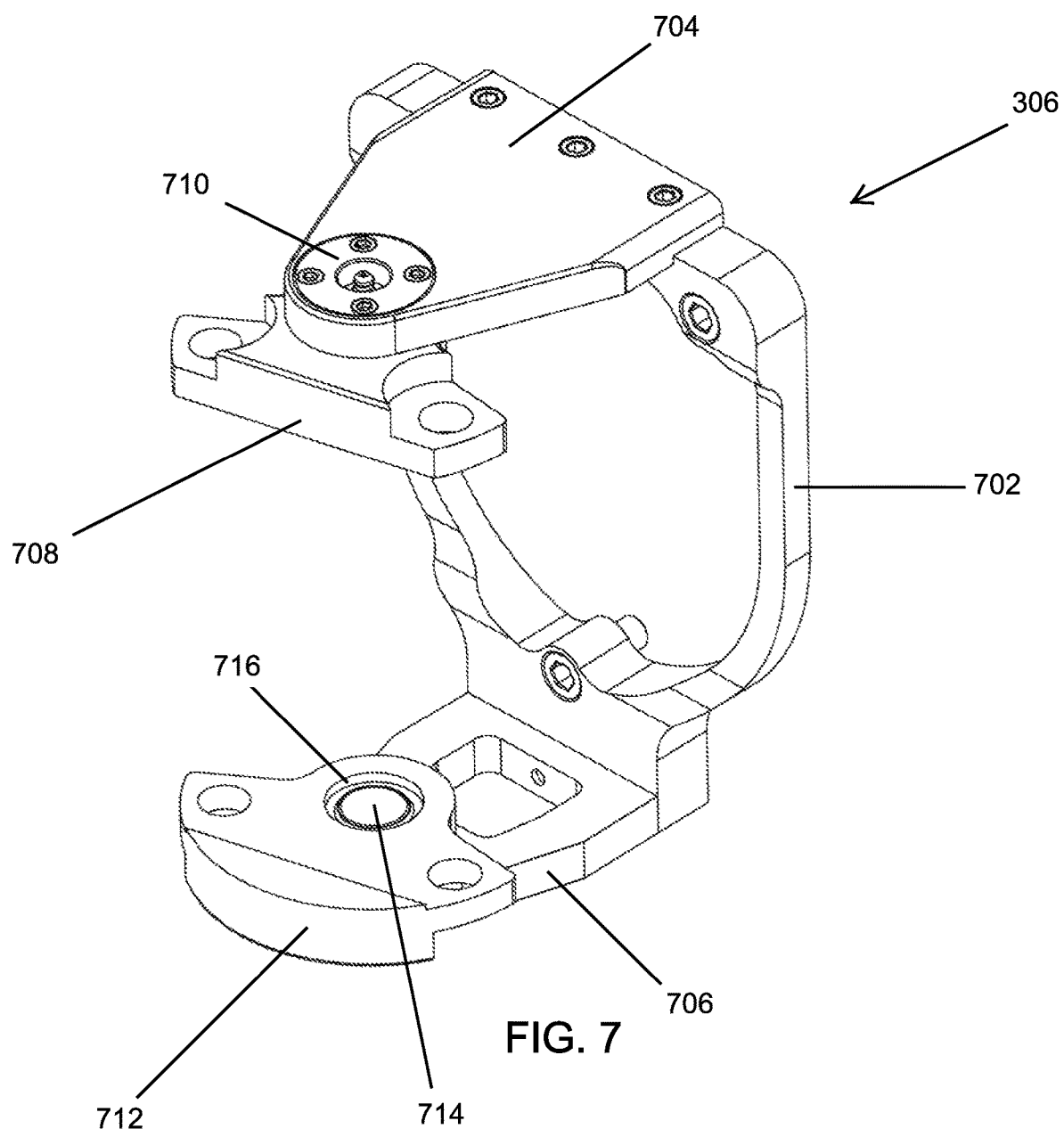
FIG. 7 is a front perspective view of one example of a mounting assembly of the present invention.

FIG. 7 is a front perspective view of the mount assembly 306. The mount assembly 306 includes a mount bracket 702 coupled between an upper pivot mount 704 and a lower pivot mount 706. The upper and lower pivot mounts 704, 706 may be coupled to the mount bracket 702 by fasteners, weldments, or other suitable means.

The upper pivot mount 704 includes a upper pivot bracket 708 pivotally attached to the free end of the upper pivot mount 704 by a pivot pin 710 with corresponding ball joint (not shown) assembly. Similarly, The lower pivot mount 706 includes a lower pivot bracket 708 pivotally attached to the free end of the lower pivot mount 706 by a pivot pin 714 with corresponding ball joint 716 assembly. The pivot brackets 708, 712 are adapted to mount, by fasteners, the head 104 (FIG. 1) of the power jaw. Thus, the nut adjustment assembly 300 is pivotally mounted to the head 104 (FIG. 1) such that the hook 102 and the nut adjustment assembly 300 pivots about a predetermined vertical axis relative to the head 104 by pivotally attaching the nut adjustment assembly 300 to the head at the upper and lower pivot mounts 704, 706.

The pivot pins 710, 714 integrated within the free ends of the pivot mounts 704, 706 allow the nut adjustment assembly 300 and the hook 102 to pivot relative to the head (104). In this way, the relationships between the hook and the nut adjustment assembly 300 are such that rotation of a portion of the nut adjustment assembly 300 caused the jaw to open or close to a desired position relative to a particular diameter of the pipe joint.

Figure 8:
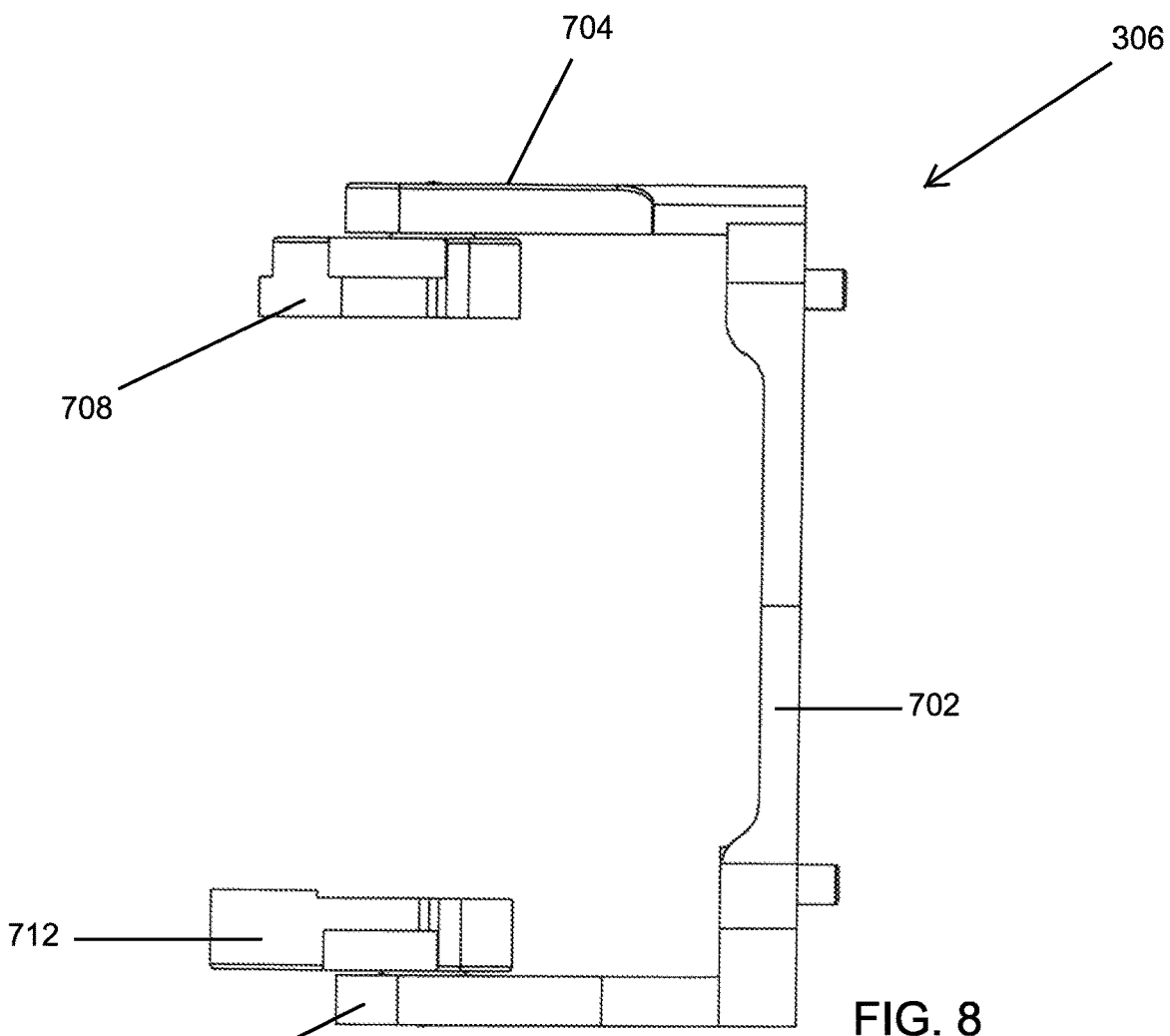
FIG. 8 is a side view of the mounting assembly of FIG. 5.
Figure 9:
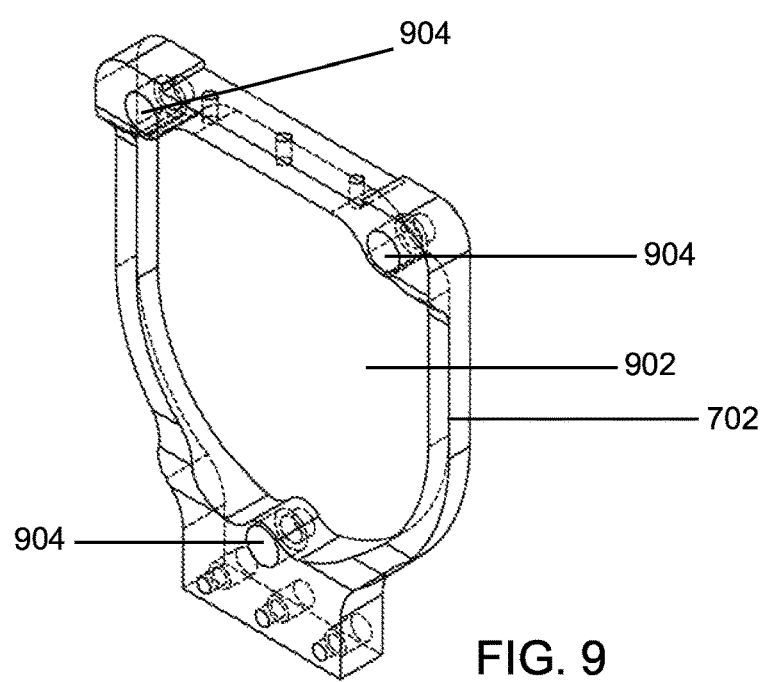
FIG. 9 is a side perspective view of the mount bracket of the mounting assembly of FIG. 7.

FIG. 8 is a side view of the mount assembly of FIG. 5, which illustrates the orientation of the upper and lower pivot mounts 704, 706 and their corresponding pivot brackets 708, 712, relative to the mount bracket 702. FIG. 9 is a side perspective view of the mount bracket 702. The mount bracket 702 includes a cut-out 902 for receiving the shank end of the hook. The mount bracket 702, further, includes one or more countersunk screw holes 904 for receiving fasteners used to attach the mount assembly 306 to the front end of the front housing 302.

FIGS. 10 and 11 are perspective views of the upper pivot mount 704 and the lower pivot mount 706, respectively. As shown, each pivot mount 704, 706 includes a generally triangular body having a seat 1002, 1102 formed in an upper portion of the body for mounting the pivot pin 710, 714.

FIGS. 12a-12d illustrated side top cross-section and perspective views, respectively, of the pivot pens 710, 714. As shown, the pivot pins 710, 714 include a cylindrical body 1202 that extends axially downward from a pin head 1204. The head 1204 may one or more countersunk screwholes 1206 for receiving fasteners that couple the pin head 1204 to the seats 1002, 1102 of the pivot mounts 704, 706.

Figure 13:
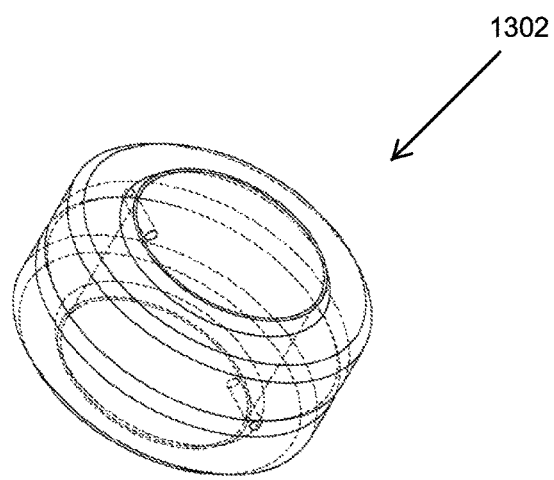
FIG. 13 illustrates one example of the ball mount of the mounting assembly FIG. 7.

FIG. 13 illustrates an example of a ball joint 1302 that may be used in connection with the pivot pins 710, 714 to enable pivot brackets 708, 712 to pivot relative to the pivot mounts 704, 706.

Figures 14, 15:
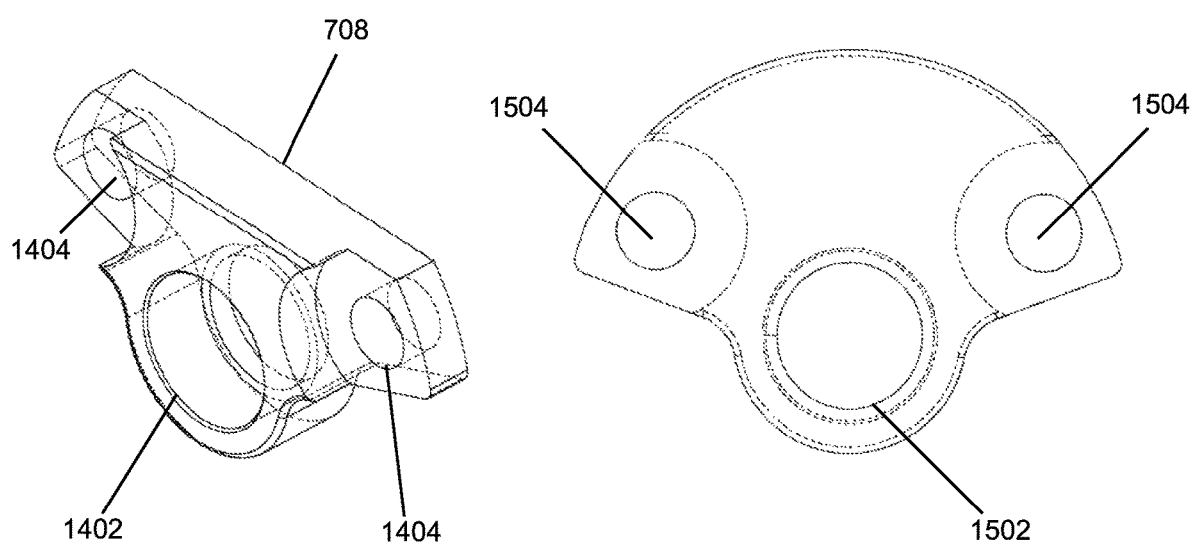
FIG. 14 illustrates one example of a lower pivotal nut mount.
FIG. 15 illustrates one example of an upper lower pivotal nut mount.

FIG. 14 illustrates one example of an upper pivot bracket 708. As shown, the bracket 708 includes a countersunk hole 1402 for receiving a ball joint 1302 and the cylindrical body 1206 of its corresponding pivot pin 710. The bracket 708 further includes screw holes 1404 for fastening the bracket to the head (104). When coupled to the upper pivot mount 704 by the pivot pin 710 and the ball joint 1302, the upper pivot bracket 708 is capable of pivoting relative to the upper pivot mount 704.

FIG. 15 illustrates one example of a lower pivot bracket 712. As shown, the bracket 712 includes a countersunk hole 2102 for receiving the ball joint 716 and the cylindrical body 1206 of its corresponding pivot pin 714. The bracket 708 further includes screw holes 2104 for fastening the bracket to the head (104). When coupled to the upper pivot mount 712 by the pivot pin 714 and the ball joint 716, the lower pivot bracket 712 is capable of pivoting relative to the lower pivot mount 706.

Figure 16:
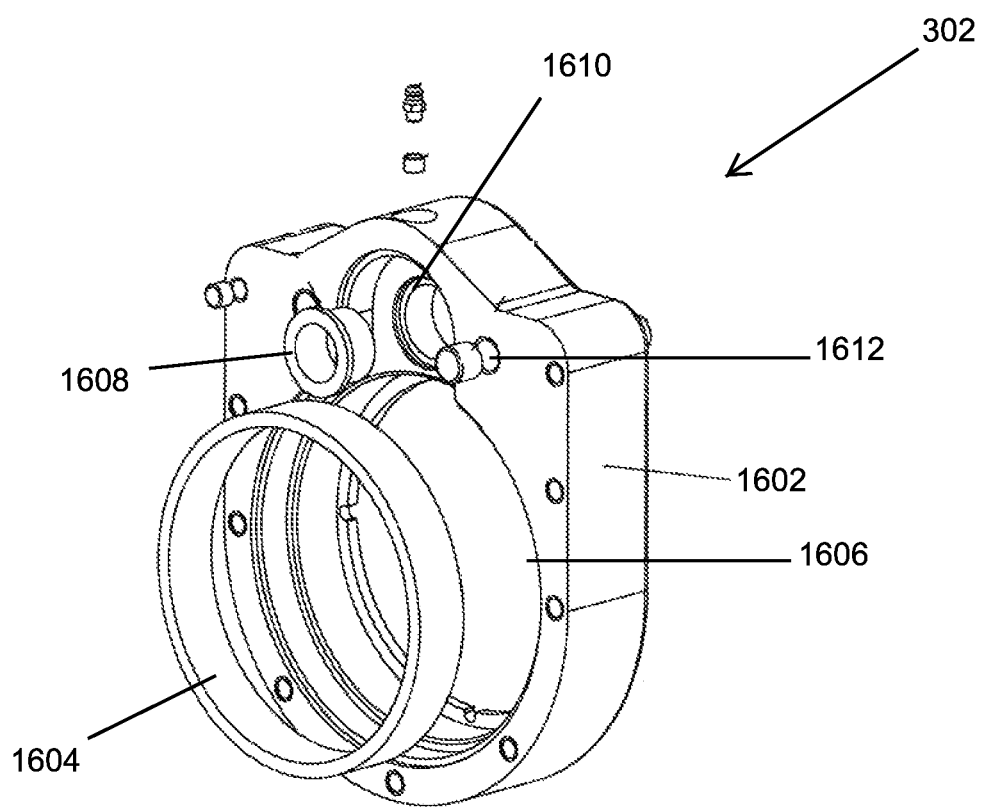
FIG. 16 is a side perspective view of the front housing of the gear nut adjustment assembly of FIG. 3.

FIG. 16 is a side perspective view of the front housing 302 of the gear nut adjustment assembly 300. The front gear housing 302 includes housing body 1602, a bearing 1604 coupled within an opening 1606 formed in the bearing body 1602. The gear housing 302 further includes a flange bearing 1608 coupled within a seat 1610 formed in an upper portion of the housing body 1602. The gear housing 302 also includes one or more tapped holes 1612 for receiving fasteners coupling the mount assembly 306 to the front face of the bracket 302, and a grease fitting 1614 coupled to the top of the body 1602. The inner diameter (I.D.) of the bearing 1604 may correspond with the outer dimensions of the adjustment nut 402, such that the bearing 1604 retain the adjustment nut 402 within opening 1606, in rotatable relation to the bearing body 1602.

Figure 17:
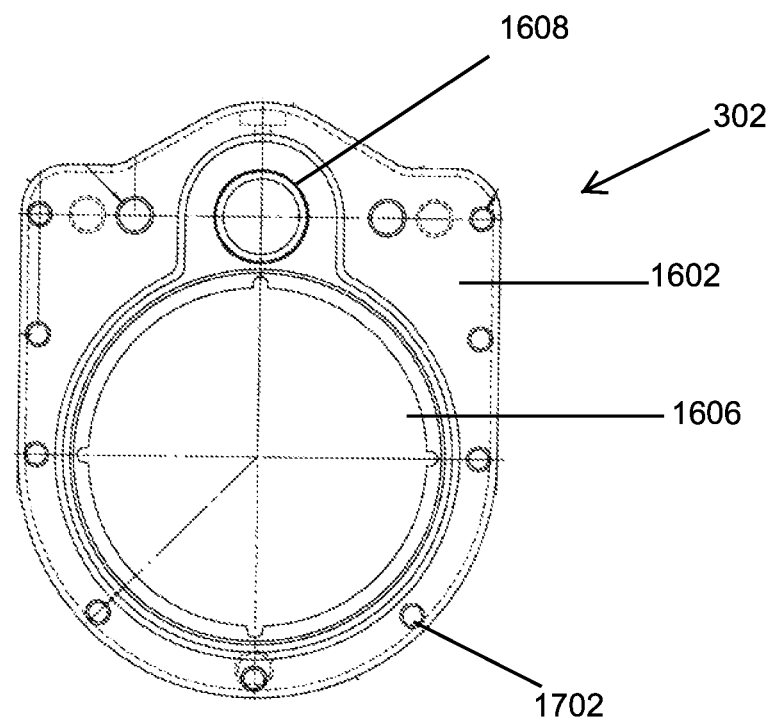
FIG. 17 is a front view of the front housing of FIG. 16.

FIG. 17 is a front view of the front housing 302 illustrating opening 1606 and flange bearing 1608. As illustrated, the housing body 1602 includes one or more threaded holes 1702 disposed about the perimeter of the body for receiving fasteners coupling the front housing 302 to the rear housing 304.

Figure 18:
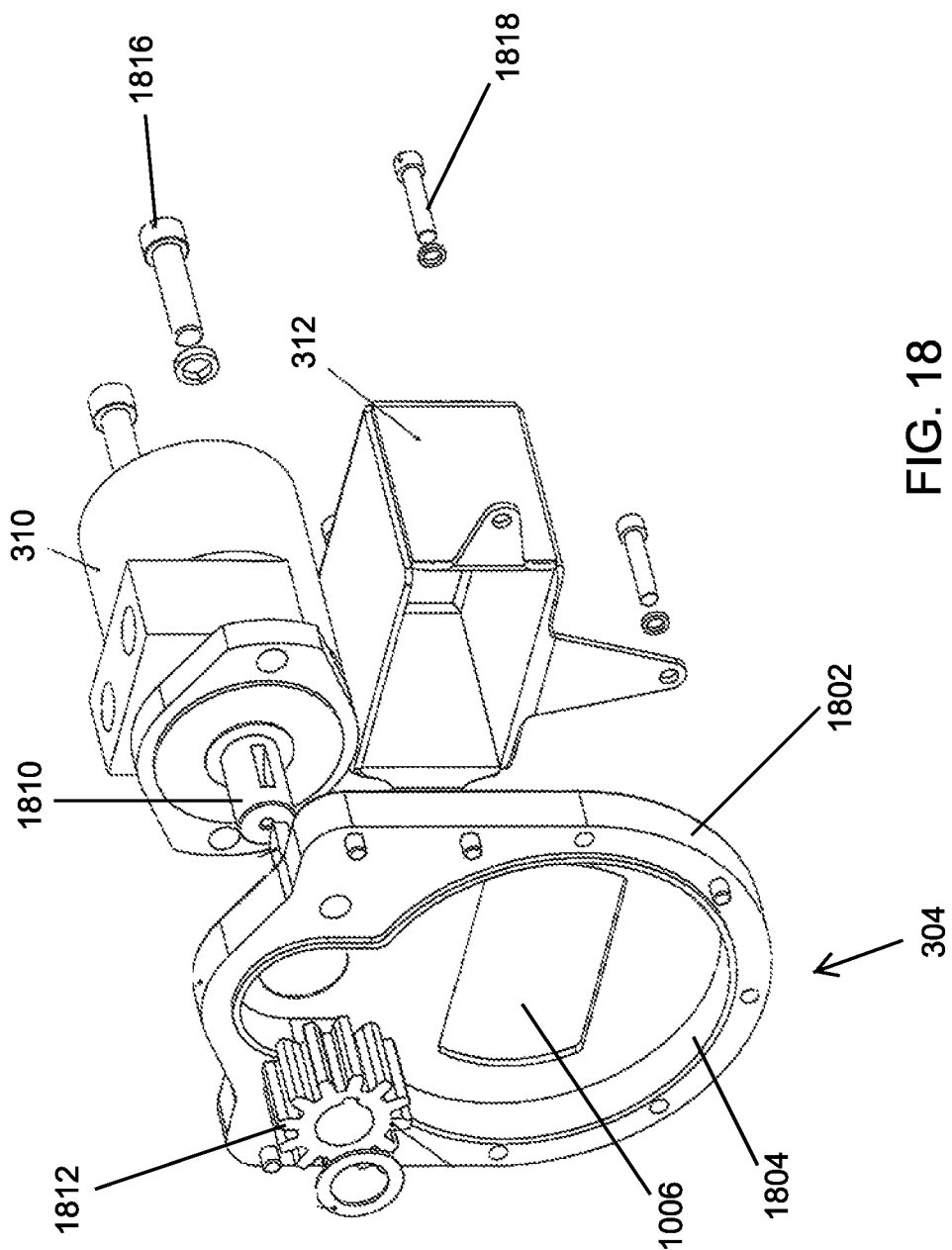
FIG. 18 an exploded view of the rear housing of the gear nut adjustment assembly of FIG. 3.

FIG. 18 an exploded view of the rear housing 304 of the gear nut assembly 300. As illustrated, the rear housing 304 includes a housing body 1802 having a recessed portion 1804. Formed within the recessed portion 1804 is an opening 1806 for receiving the shank end 202 of the hook 102 (FIG. 1), and a hole 1808 for passing an drive shaft 1810 connected to the motor 310. The rear housing 304 also includes a drive gear 1812 coupled to the drive shaft 1810 of the motor 310 by a key.

As shown, the motor 310 may be mounted to the rear housing 304 by fasteners 1816. The motor 310 may be a hydraulic motor or any other suitable drive mechanism. In this configuration, the motor 310 is offset from the center line of the shank end of the hook. Thus, providing a compact assembly where the motor does not interfere with the translation of the shank end 202 (FIG. 2) within the nut assembly 308.

The hook cover 312 may also be coupled to the rear gear housing by fasteners 1818. As shown, the hook cover 312 forms an enclosure 1820 for receiving the shank end 202 of the hook 102 as it is translated linearly during operation. The hook cover 312 protects the shank end 202 from debris and other moving parts during operation. While the hook cover 312 is show herein as a rectangular box, the hook cover 312 may be made of any shape or length suitable to enclose the shank end of the hook.

Figure 19:
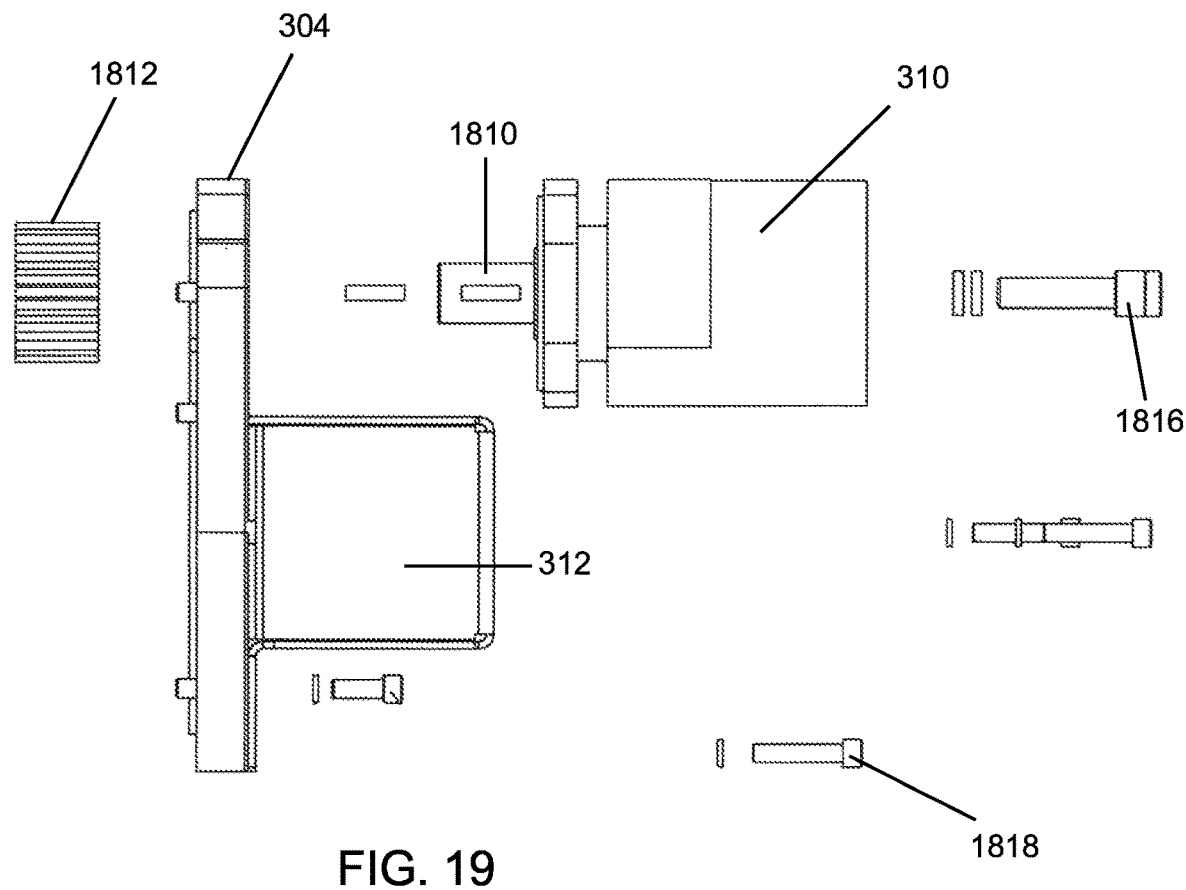
FIG. 19 is a side view of the rear housing of the gear nut adjustment assembly as illustrated in FIG. 18.
Figure 20:
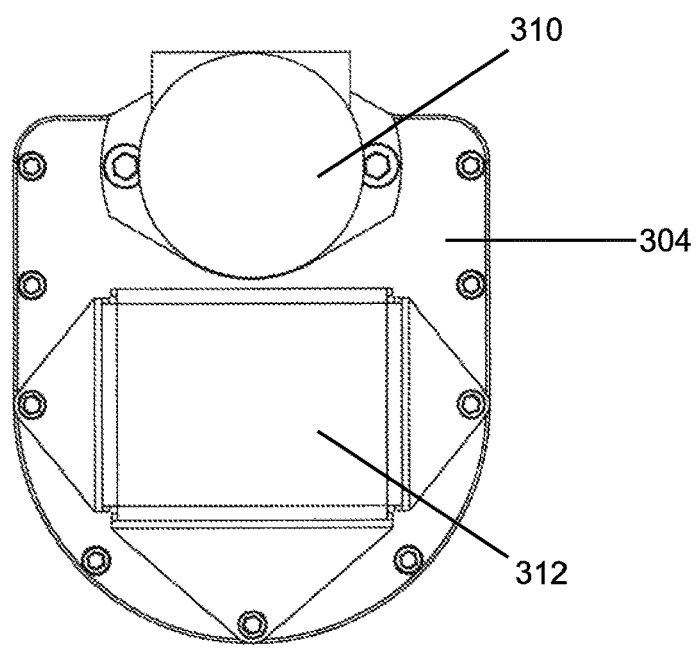
FIG. 20 is a rear view of the rear housing of the gear nut adjustment assembly.

FIG. 19 is a side exploded view of the rear housing 304 of the gear nut adjustment assembly 300. FIG. 20 is a rear view of the rear housing 304, illustrating the motor 310 and the hook cover 312 coupled to the rear of the rear housing 304.

During operation, the motor 310, through the drive shaft 1810, drives drive gear 1812. The drive gear 1812 then engages the ring gear 404 coupled to the adjustment nut 402, to rotate the adjustment nut 402. The threaded opening 602 in the adjustment nut 402 engages the threading of the shank end 202 of the hook 102 such that the shank end 202 of the hook 102 translates linearly as the adjustment nut 402 is rotated. Accordingly, when the adjustment nut 402 is rotated clockwise, the shank end 202 is retracted or translated into the interior of the opening 602, thereby closing the hook 102. To the contrary, when the adjustment nut 402 is rotated counter-clockwise, the shank end is moved away from the opening 602, and the hook 102 is opened for receiving a pipe joint. When assembled, the threaded opening 602 of the adjustment nut 402, opening 1606 of the front housing 302, opening 1806 of the rear housing 304, and the enclosure 1820 of the hook cover 312 are aligned for receiving the shank end 202 of the hook 102 as it is translated during operation.

By way of mechanical advantage, the gear train assembly of the present invention enables the shank end 202 of the hook 102 to be moved at low input torque values. By adjusting the gear ratio (i.e., adjusting the size or number of teeth of the ring gear relative to the drive gear), the power transmission and gear reduction may be adjusted. In particular, the operating torque applied to ring gear 404 may be adjusted by adjusting the dimensions of the drive gear 1812 relative of the dimensions of ring gear 404, and vice versa.

Figure 21:
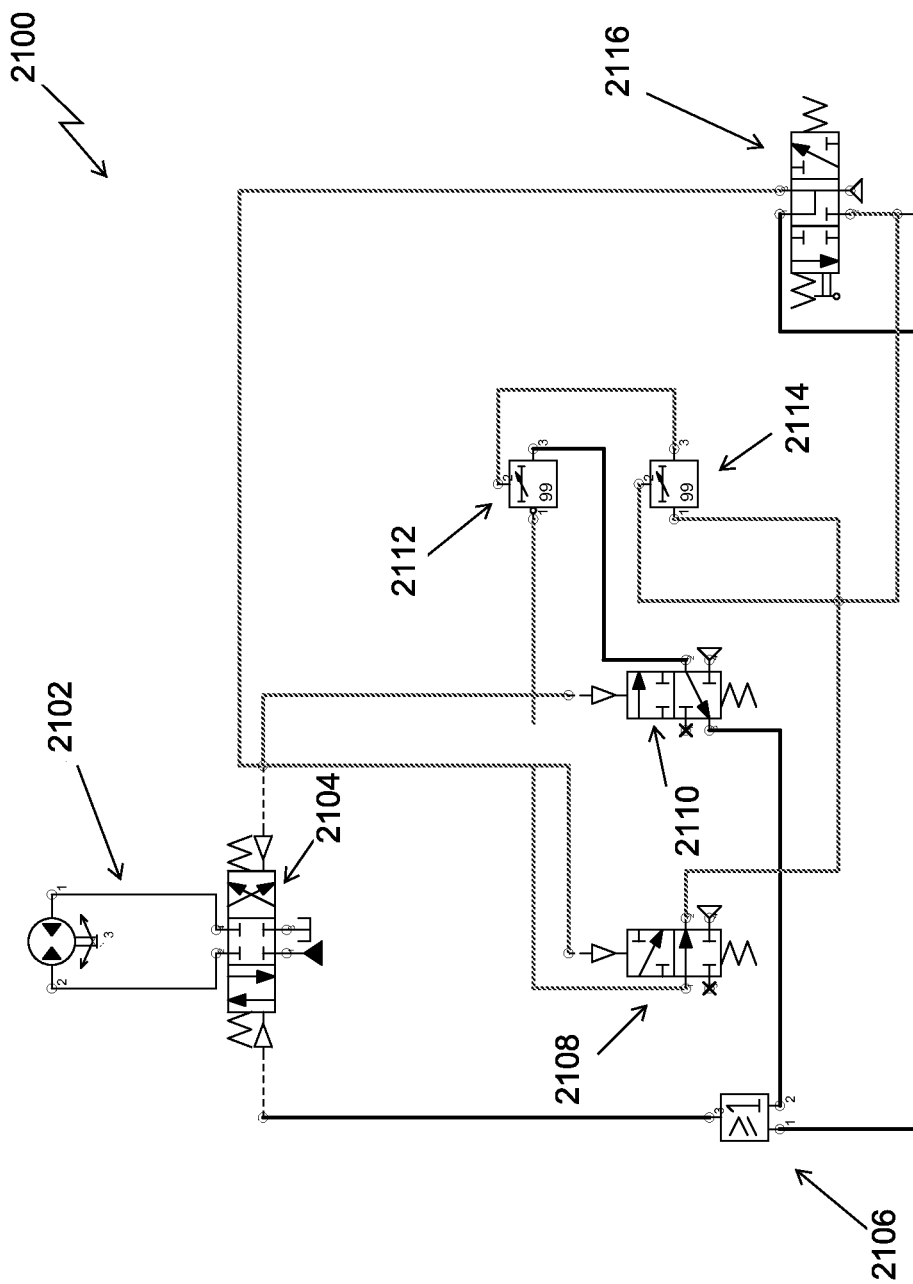
FIG. 21 is a schematic diagram of the circuit control components used to control the hydraulic motor and, by utilizing pneumatic logic, reverse the motor movement to space the die holders away from the pipes.

FIG. 21 is a schematic diagram 2100 of the circuit control components used to control the hydraulic motor 2102. As illustrated, the circuit components include a hydraulic directional valve 2104 in communication with the hydraulic motor 2102. The hydraulic directional valve 2104 controls the direction of the hydraulic motor 2102. The components further include a logic element, 2106, which in this case is an "or" logic element, a first and second piloted valve 2108 and 2110, an "off" delay timer 2112, an on delay timer 2114 and a SPDT switch 2116.

In operation, the control system is designed to utilize pneumatic logic, using an "or" logic element 2106, to reverse the motor 2102 movement upon contact of the die holder of the hook (not shown), with the pipe. The motor movement is reversed for a predetermined time to space the die holders away from the pipe at a predetermined distance. For purposes of this description, when the die holders are moving toward the pipe, the motor 2102 shall be characterized as moving in the forward direction. When the die holders are moved away from the pipe after contact, the motor 2102 shall be characterized as moving in the reverse direction.

To run the motor 2102 in the forward direction, the pneumatic single pole double throw ("SPDT") switch 2116 is engaged and the air piloted valves 2108, 2110 are closed, thereby initiating the time circuit consisting of the "on" and "off" delay timers. 2114, 2112. The pneumatic single pole double throw ("SPDT") switch 2116 is engaged utilizing a spring loaded switch that is returned to center when released.

As illustrated in FIG. 15, to signal the motor 2102 to run in reverse, the SPDT switch 2116 is engaged, resulting in a direct connection between the SPDT switch 2116 and the hydraulic directional valve 2102.

The time circuit consists of the "off" delay timer 2112 and the "on" delay timer, both of which includes one air supply, one signal and one output. In operation, the timer is signaled with a negative drop to zero in air pressure, an internal valve connects the air supply so that air is output for a predetermined amount of time. Once the predetermined time has elapsed, the timer breaks the internal valve connection and stops the supply of air. Thus, the timer shuts off the air supply to the hydraulic directional valve 2104 to cease the operation of the motor 2102 in the reverse direction.

Upon initial startup of the system, the "on" timer is arranged to delay the air supply to the "off" timer. This delay allows the "off" timer to do one time cycle on initial pressurizing of the circuit.

Figure 22:
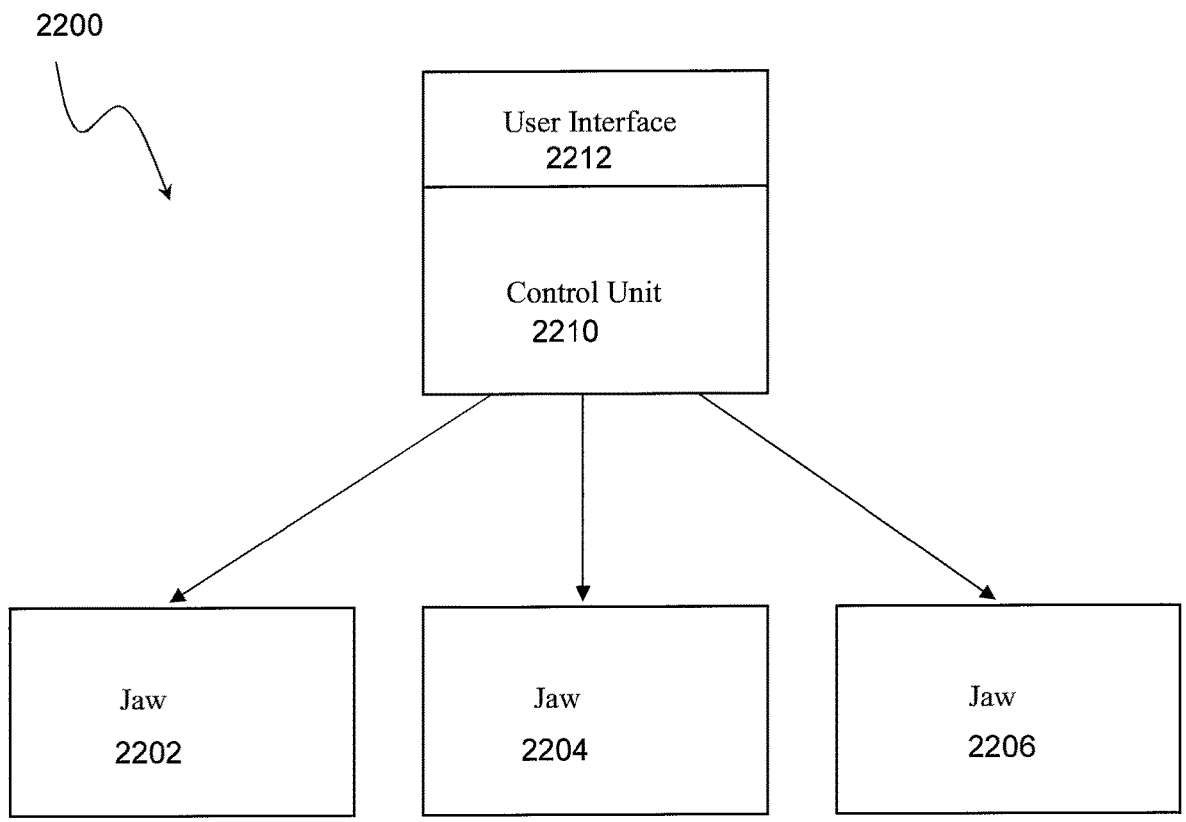
FIG. 22 is a block diagram illustrating a system for automatically adjusting the plurality of power jaws mounted on a tool joint to accommodate pipes of varying sizes.

FIG. 22 is a block diagram 2200 illustrating a system for automatically adjusting a plurality of power jaws 2202, 2204, 2206 when mounted on a pedestal assembly to accommodate pipes of varying sizes. By utilizing automatically adjusting power jaws 2202, 2204, 2206, the jaws may be remotely adjusted from an operator's console which, as illustrated in FIG. 22, may include a control unit 2210 and a user interface 2212. The control unit 2210 is adapted to adjust the power jaws 2202, 2204, 2206 by controlling the operation, including the directional operation, of the hydraulic motor 506 as required to accommodate various pipe diameters. For example, the control unit 2210 may allow the operator, via the user interface 2212, to open the power jaws to wide enough to receive large diameter pipe joints for which the power jaws 2202, 2204, 2206 are to make or break. While the opening and closing of the power jaws 2202, 2204, 2206 may be controlled by the operator of the control unit 2210. The control unit 2210 may be program with predetermined setting for various pipe sizes. Then the control unit 2210, based upon predetermined settings, opens the power jaw 2202, 2204, 2206 wide enough to receive a pipe of such diameter by controlling the operation of the hydraulic motor 506 (see FIG. 21). Further, the control unit 2210, once the pipe is insert into the power jaws 2202, 2204, 2206 may then initiate the hydraulic motor 310 to turn the nut assembly 402 until the die holders (not shown) touch the pipe. Once the die holders touch the pipe, the die holders are then backed off the pipe by reversing the motor for a predetermined time. Depending upon the sophistication of the control unit 2210 and the processes stored in memory, the operation of the hydraulic motor 310 may be entirely or partially controlled by user actuation and/or execution of instructions stored in the memory of the control unit 2210.

When a control unit 2210 is utilized in connection with multiple power jaws 2204, the jaw adjustment may be made simultaneously. Alternatively, the jaw adjustments of each jaw may be made sequentially. In either case, by providing for automated jaw adjustment without the need for manually adjustment, adjustment time is minimized. Further, the safety of operations of the jaws is increased by minimizing operator contact with the jaws.

Further, modifications and variations are possible in light of the above description or may be acquired from practicing the invention. For example, although the above illustrated descriptions and illustrations show the use of a hydraulic motor 310 to drive the nut adjustment assembly 300, other types of motors known for rotatably driving the mechanical engagement of components, such as, for example, a pneumatic motor or electric motor may also be utilized to drive the nut adjustment assembly 300 of the invention.

It will further be understood, and is appreciated by persons skilled in the art, that one or more processes, sub-processes, or process steps described in connection with FIGS. 21 and 22 may be performed by hardware and/or software. If the process is performed by software, the software may reside in software memory (not shown) in a suitable electronic processing component or system such as, one or more of the functional components or modules schematically depicted in FIGS. 21 and 22. The software in software memory may include an ordered listing of executable instructions for implementing logical functions (that is, "logic" that may be implemented either in digital form such as digital circuitry or source code or in analog form such as analog circuitry or an analog source such an analog electrical, sound or video signal), and may selectively be embodied in any computer-readable medium for use by or in connection with an instruction execution system, apparatus, or device, such as a computer-based system, processor-containing system, or other system that may selectively fetch the instructions from the instruction execution system, apparatus, or device and execute the instructions. In the context of this disclosure, a "computer-readable medium" is any means that may contain, store or communicate the program for use by or in connection with the instruction execution system, apparatus, or device. The computer readable medium may selectively be, for example, but is not limited to, an electronic, magnetic, optical, electromagnetic, infrared, or semiconductor system, apparatus or device. More specific examples, but nonetheless a non-exhaustive list, of computer-readable media would include the following: a portable computer diskette (magnetic), a RAM (electronic), a read-only memory "ROM" (electronic), an erasable programmable read-only memory (EPROM or Flash memory) (electronic) and a portable compact disc read-only memory "CDROM" (optical). Note that the computer-readable medium may even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The foregoing description of implementations has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed is:

1. A gear nut adjustment assembly for receiving a shank end of a hook of a power jaw assembly, the gear nut adjustment assembly comprising:
   a nut assembly having a ring gear mounted on a rear of the nut assembly where the ring gear has an enclosed opening for the shank end to pass through the enclosed opening of the ring gear;
   a housing for mounting the nut assembly within the housing, the housing further including a motor mounted at one end and mounting assembly mounted to an opposing end of the housing; and
   the housing further containing a drive gear in direct contact with the ring gear of the nut assembly such that the drive gear is in communication with and directly driven by the motor.

2. The gear nut adjustment assembly of claim 1 where the nut assembly includes threading on an inner surface of the nut assembly for receiving the shank end of the power jaw.

3. The gear nut adjustment assembly of claim 1 where the housing includes a front housing member and rear housing member.

4. The gear nut adjustment assembly of claim 3 where the mounting assembly is mounted on the front housing member.

5. The gear nut adjustment assembly of claim 3 where the motor is mounted on the rear housing member.

6. The gear nut adjustment assembly of claim 3 where the rear housing member includes a recess for receiving the drive gear and an opening for receiving a drive shaft of the motor to rotatably drive the drive gear.

7. The gear nut adjustment assembly of claim 3 where a recess of the rear housing member is located such that the drive gear, when positioned within the recess is in engagement with the ring gear of the nut assembly.

8. A gear nut adjustment assembly for receiving a shank end of a hook of a power jaw assembly, the gear nut assembly comprising:
   a nut assembly having a ring gear mounted on the rear of the nut assembly, wherein the nut assembly has a threaded interior opening for rotatably passing the shank end of the hook of the power jaw through the nut assembly; and
   a motor operatively coupled to the nut assembly, wherein the motor has a central rotational axis that is offset from the threaded interior opening for passing the shank end such that the motor does not interfere with the linear translation of the shank end passing longitudinally through the threaded interior opening, and where the central rotational axis of the motor is offset from, and parallel to, the threaded interior opening of the nut assembly.

9. The gear nut assembly of claim 8 where the nut adjustment assembly further includes a housing for containing the nut assembly and where the motor is mounted onto a rear of the housing.

10. The gear nut adjustment assembly of claim 8 where the nut assembly further includes a ring gear mounted on a rear of the nut assembly and where the motor drives the ring gear to rotate the nut assembly.

11. The gear nut adjustment assembly of claim 9 where the housing contains a gear assembly driven by the motor for driving the nut assembly.

12. The gear nut adjustment assembly of claim 11 where the gear assembly includes a ring gear mounted to the nut assembly and a drive gear mounting to the motor such that the ring gear and drive gear are in rotatably communication with one another.

13. The gear nut adjustment assembly of claim 8 where the housing further includes a mounting assembly for mounting the gear nut adjustment assembly to the power jaw.

14. A method of increasing the operating torque of a gear nut adjustment assembly, the method comprising:
providing a nut assembly having a ring gear mounted on the rear of the nut assembly, where the nut assembly is in threaded engagement with a shank end of the hook of a power jaw and, where the rotation of the ring gear translates the shank end linearly;
providing drive gear operative coupled to the ring gear, where the drive gear has fewer teeth than the ring gear and where the drive gear is coupled to a motor;
applying an input torque to the drive gear; and
transmitting the input torque to the ring gear to increase the torque to translate the end shank.

15. The method of claim 14 where operating torque applied to ring gear may be adjusted by adjusting the dimensions of the drive gear relative of the dimensions of ring gear.

16. A gear nut adjustment assembly, the gear nut assembly comprising:
a hook having a shank end, the shank end having a threaded exterior;
a nut assembly having a ring gear mounted on the rear of the nut assembly, wherein the nut assembly has a threaded interior opening for rotatably receiving the threaded exterior of the shank end of the hook of the power jaw for linearly moving the shank end of the hook of the power jaw longitudinally through the nut assembly, and where the ring gear has a central rotational axis; and
a motor operatively coupled to the nut assembly, wherein the motor is in communication with a drive gear having a central rotational axis, wherein the central rotational axis of both the ring gear and drive gear are parallel to the longitudinal linear movement of the shank end of the hook of the power jaw assembly.

17. The gear nut adjustment assembly of claim 16 where the drive gear is in direct contact with both the motor and ring gear of the nut assembly.

18. The gear nut adjustment assembly of claim 16 where the motor has a central rotational axis that is offset from the threaded interior opening of the nut assembly, and where the central rotational axis of the motor is parallel to the threaded interior opening of the nut assembly.

* * * * *